United States Patent
Ogushi

(10) Patent No.: US 8,976,405 B2
(45) Date of Patent: Mar. 10, 2015

(54) PRINTING APPARATUS AND CONTROL METHOD THEREFOR

(75) Inventor: Takuhiro Ogushi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 87 days.

(21) Appl. No.: 13/305,544

(22) Filed: Nov. 28, 2011

(65) Prior Publication Data

US 2012/0154870 A1 Jun. 21, 2012

(30) Foreign Application Priority Data

Dec. 20, 2010 (JP) ................................ 2010-283724

(51) Int. Cl.
| | |
|---|---|
| G06K 15/00 | (2006.01) |
| G06F 3/12 | (2006.01) |
| H04N 1/00 | (2006.01) |
| B41J 2/165 | (2006.01) |
| G03G 15/00 | (2006.01) |

(52) U.S. Cl.
CPC .......... *G06K 15/402* (2013.01); *G06K 15/4055* (2013.01); *Y02B 60/1267* (2013.01)
USPC ....... 358/1.16; 358/1.12; 358/1.13; 358/1.14; 358/1.15; 358/1.6; 347/23; 399/88

(58) Field of Classification Search
None
See application file for complete search history.

(56) References Cited

U.S. PATENT DOCUMENTS

| | | | | |
|---|---|---|---|---|
| 5,884,122 | A | * | 3/1999 | Kawabuchi et al. ............ 399/88 |
| 2008/0129775 | A1 | * | 6/2008 | Hayakawa ....................... 347/23 |
| 2009/0237729 | A1 | * | 9/2009 | Yabuki .......................... 358/1.15 |
| 2011/0122436 | A1 | | 5/2011 | Ogushi |

FOREIGN PATENT DOCUMENTS

JP 2006-215686 A 8/2006

OTHER PUBLICATIONS

U.S. Appl. No. 13/311,527, filed Dec. 5, 2011. Applicant: Takuhiro Ogushi.

* cited by examiner

*Primary Examiner* — Tammy Pham
*Assistant Examiner* — Frantz Bataille
(74) *Attorney, Agent, or Firm* — Fitzpatrick, Cella, Harper & Scinto

(57) ABSTRACT

A printing apparatus comprising a storage unit having a driving unit, determines whether or not access to the storage device is required with reception of data; determines whether or not a predetermined period of time has elapsed after transition to a first operation state; in a case where the predetermined period of time has elapsed, obtains, as an estimation time, a period of time until next reception of data that requires access to the storage device based on history information; and causes the printing apparatus to transition from the first operation state to a second operation state in a case where the estimation time exceeds a threshold of a period of time decided based on an amount of power consumption for when the driving unit is driven, and maintain the printing apparatus in the first operation state in a case where the estimation time does not exceed the threshold.

9 Claims, 11 Drawing Sheets

F I G. 11
| IP ADDRESS OF HOST APPARATUS | PROTOCOL | PORT NUMBER | ACCESS TIME 1 | ACCESS TIME 2 |
|---|---|---|---|---|
| 192.168.0.10 | TCP | 10000 | 13:36 | 13:31 |
| 192.168.0.10 | TCP | 10001 | 13:30 | 13:20 |
| 192.168.0.11 | TCP | 10000 | 13:38 | 13:33 |
F I G. 12
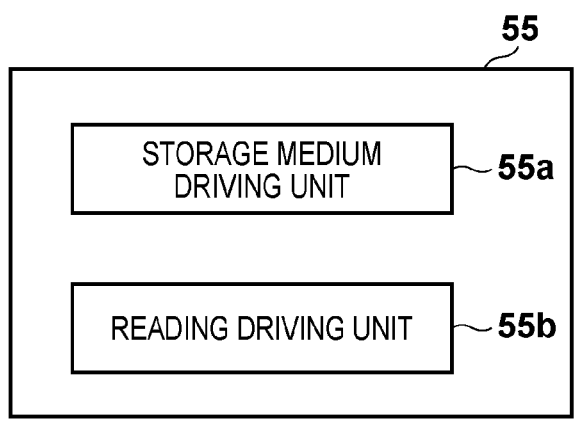

PRINTING APPARATUS AND CONTROL METHOD THEREFOR

BACKGROUND OF THE INVENTION

1. Field of the Invention

The present invention relates to a printing apparatus and a control method therefor.

2. Description of the Related Art

Generally, a printing apparatus is connected to a host apparatus (e.g., PC (personal computer)), and forms an image on a printing medium according to print data from the host apparatus, thereby performing printing. Data that is not print data is also exchanged between the printing apparatus and the host apparatus for achieving improved operability, effective operation of the printing apparatus, and the like.

For example, information for managing the printing apparatus (e.g., status information and remote setting information) and print history information for, for example, calculating the cost of print operation (e.g., information including the amount of ink or sheets used, a host that sends a print request, and the like) are exchanged between the apparatuses. Normally, the information is stored in a RAM (random access memory), a non-volatile memory, an HDD (hard disk drive) or the like provided in the printing apparatus.

Generally, a printing apparatus includes a low power consumption mode for reducing the power consumption, in addition to a normal operation mode. In the printing apparatus including such a mode, when no print data has been received from the host apparatus for a certain period of time, the printing apparatus transitions to the low power consumption mode, and thereby reduces the power consumption in the standby state.

In the low power consumption mode, the power consumption is reduced by stopping supply of power to the units of the printing apparatus (e.g., a CR motor, a LF motor, other motors, various sensors, an inkjet printhead, and an HDD), stopping the operation of a control CPU (central processing unit), and the like. Note that an interface control unit (IF control unit) of the printing apparatus for exchanging data with the host apparatus is controlled such that the IF control unit can exchange print data and other data with the host apparatus, even after the printing apparatus has transitioned to the low power consumption mode. When print data is received in the low power consumption mode, the printing apparatus returns to the normal operation mode due to the notification from the IF control unit, and performs a print operation. When data that is not print data is exchanged, the printing apparatus once returns only units necessary for that data exchange (e.g., a CPU, a RAM, a non-volatile memory and an HDD) to the operation state due to a notification from the IF control unit. Then, after communication with the host apparatus ends, the printing apparatus stops the returned units again.

In the case of a printing apparatus capable of connecting a network, it is necessary to exchange data with a plurality of host apparatuses connected to the network. When a large number of host apparatuses are connected, the above-described data exchange is often performed, and thus the efficiency in reducing the power consumption of the printing apparatus is not improved so greatly. That is, when a large number of host apparatuses are connected, data exchange with the host apparatuses often occurs. Accordingly, even if the printing apparatus transitions to the low power consumption mode, the units of the printing apparatus necessary for data exchange are in the operation state for a long period of time, so that the efficiency in reducing the power consumption deteriorates. In particular, in a printing apparatus including an HDD, if transition between the operation state and the low power consumption mode is often performed, deterioration in the efficiency in reducing the power consumption is remarkable due to an increased number of times the HDD is turned on and off. This is because a large amount of power is consumed in the spinup operation performed when the HDD is turned on.

Also, the number of times the HDD is turned on and off has a close relation to the product life of the HDD, in terms of durability of the head (the number of times the head can be loaded and unloaded). An increase in the number of times the HDD is turned on and off influences the product life of the HDD.

In Japanese Patent Laid-Open No. 2006-215686, a technique is disclosed in which the power consumption is continuously suppressed during the low power consumption mode. With this technique, when the printing apparatus has transitioned from the normal operation mode to the low power consumption mode, a status monitor of the host apparatus stops a polling action to the printing apparatus. Also, the status monitor of the host apparatus restarts the polling action when the printing apparatus has transitioned from the low power consumption mode to the normal operation mode.

As described above, data that is not print data is also exchanged between the printing apparatus and the host apparatus. Such data exchange is performed irrespective of whether the printing apparatus is in the normal operation mode or the low power consumption mode.

The printing apparatus is required to cause the units necessary for data exchange such as the CPU, the RAM and the HDD to transition to the operable state in order to return from the low power consumption mode and perform the data exchange. For this reason, particularly in printing apparatuses capable of exchanging data with a plurality of host apparatuses, the efficiency in reducing the power consumption deteriorates even if it is caused to transition to the low power consumption mode.

In a printing apparatus including an HDD, supply of power to the HDD and stopping of the supply of power are frequently repeated, and the power consumption reduction effect in the low power consumption mode deteriorates due to power consumption by the HDD during the spinup operation. In addition, if supply of power to the HDD and stopping of the supply of power are frequently repeated, the product life of the HDD is shortened.

Here, not only the status information from the status monitor, but also various types of data are exchanged between the printing apparatus and a host apparatus. Examples of such data exchange include data exchange according to the printer MIB controlled by the OS of the host apparatus, exchange of print history information performed by device agents. For this reason, with the method in which all polling actions from the host apparatus are stopped unconditionally, as with the above-described technique disclosed in Japanese Patent Laid-Open No. 2006-215686, various types of problems may occur.

SUMMARY OF THE INVENTION

The present invention provides a technique with which reduction in power consumption in a printing apparatus that includes an HDD can be achieved, while taking the product specifications and the power consumption characteristics of the HDD into account.

According to a first aspect of the present invention there is provided a printing apparatus comprising: a storage unit having a driving unit; a first determination unit configured to, in a case where data that is not print data is received from any of at least one host apparatuses, determine whether or not access to the storage device is required with reception of the data; a history information management unit configured to manage history information relating to reception of data that has been determined by the first determination unit to require access to the storage device; a second determination unit configured to determine whether or not a predetermined period of time has elapsed after transition to a first operation state in which power consumption is lower than that in a normal operation and the storage device is turned on; an obtaining unit configured to, in a case where the second determination unit has determined that the predetermined period of time has elapsed, obtain, as an estimation time, a period of time until next reception of data that requires access to the storage device based on the history information; and a control unit configured to cause the printing apparatus to transition from the first operation state to a second operation state in which power consumption is lower than that in the normal operation and the storage device is turned off in a case where the estimation time exceeds a threshold of a period of time decided based on an amount of power consumption for when the driving unit is driven, and maintain the printing apparatus in the first operation state in a case where the estimation time does not exceed the threshold.

According to a second aspect of the present invention there is provided a method for controlling a printing apparatus comprising: determining, in a case where data that is not print data is received from any of at least one host apparatuses, whether or not access to a storage device having a driving unit is required with reception of the data; managing history information relating to reception of data that has been determined to require access to the storage device in the step of determining whether or not access to the storage device is required; determining whether or not a predetermined period of time has elapsed after transition to a first operation state in which power consumption is lower than that in a normal operation and the storage device is turned on; obtaining, in a case where it has been determined that the predetermined period of time has elapsed in the step of determining whether or not a predetermined period of time has elapsed, as an estimation time, a period of time until next reception of data that requires access to the storage device based on the history information; and causing the printing apparatus to transition from the first operation state to a second operation state in which power consumption is lower than that in the normal operation and the storage device is turned off in a case where the estimation time exceeds a threshold of a period of time decided based on an amount of power consumption for when the driving unit is driven, and maintaining the printing apparatus in the first operation state in a case where the estimation time does not exceed the threshold.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a diagram illustrating an example of history information.

FIG. 12 is a diagram illustrating a configuration of an HDD serving as an example of a storage device.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that the following description will exemplify a printing apparatus which adopts an ink-jet printing system. However, the present invention is not limited to such specific system. The printing apparatus may be, for example, a single-function printer having only a printing function, or a multi-function printer having a plurality of functions including a printing function, FAX function, and scanner function. Also, the printing apparatus may be, for example, a manufacturing apparatus used to manufacture a color filter, electronic device, optical device, micro-structure, and the like using a predetermined printing system.

In this specification, a "printing medium" means not only a paper sheet for use in a general printing apparatus but also a member which can fix ink, such as cloth, plastic film, metallic plate, glass, ceramics, resin, lumber, or leather in a broad sense.

Figure 1:
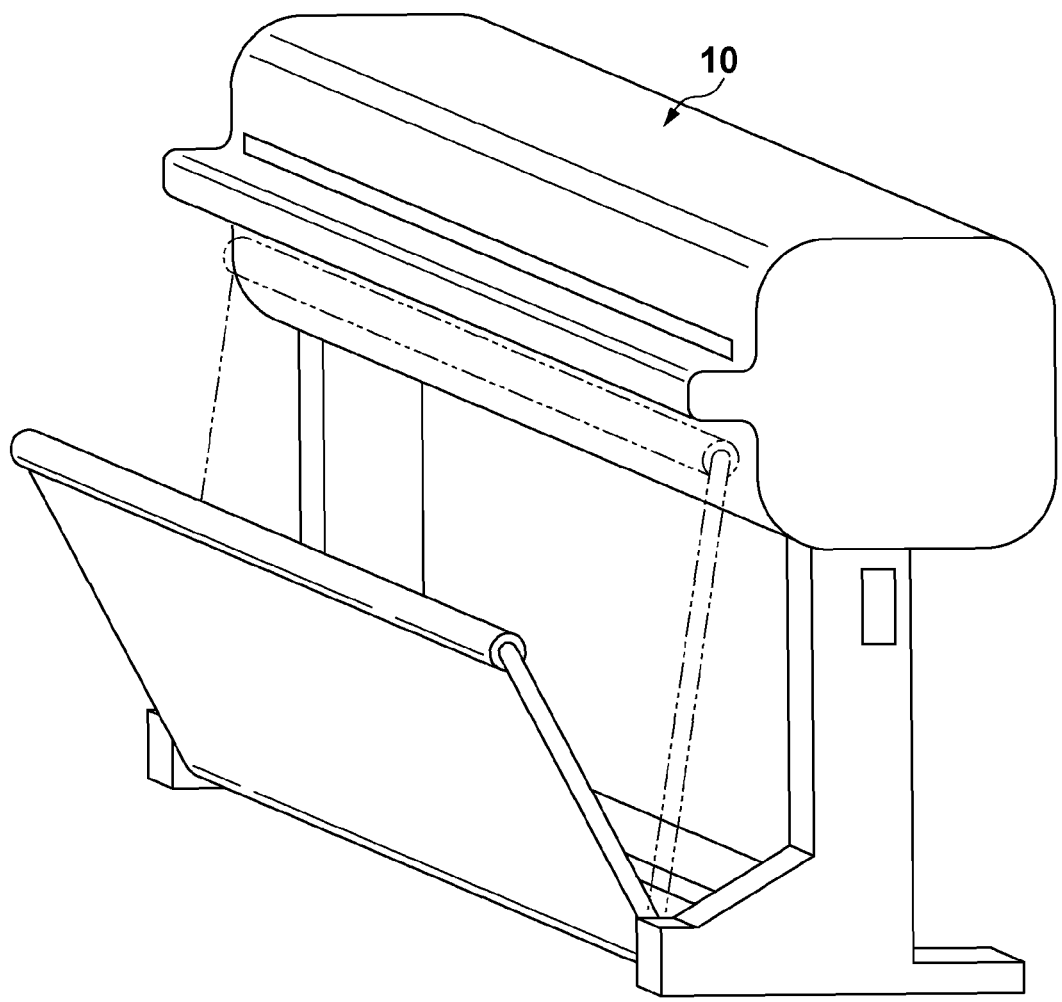
FIG. 1 is a perspective view illustrating an example of an appearance configuration of a printing apparatus according to an embodiment of the present invention.

FIG. 1 is a perspective view illustrating an example of an appearance configuration of a printing apparatus according to an embodiment of the present invention.

The printing apparatus 10 includes an inkjet printhead (not shown), and controls the printhead based on print data received from a host apparatus (not shown). Specifically, ink is discharged from orifices provided in the printhead toward a printing medium. As a result, an image (including characters, signs and the like) is formed on the printing medium.

A recovery device (not shown) for maintaining and recovering the ink discharge performance of the printhead is provided in the printing apparatus 10. In the printing apparatus 10, every time a fixed period of time has elapsed, or when clogging has occurred in the orifices, the printhead is moved to the position opposing the recovery device, where recovery processing is performed. As the recovery processing, for example, suction recovery processing, wiping (cleaning), and preliminary discharge are performed.

As the paper serving as a printing medium for printing an image (hereinafter also referred to as a "sheet"), a cut sheet having fixed sizes of width and length (e.g., A2 size and A1 size), and a roll sheet that has a fixed size of width and has a length of, for example, tens to hundreds of meters and that is rolled in a roll shape are used. Also, sheets made of various materials such as paper, plastic sheets, photographic printing paper, cloths, and leather may be used as a sheet, as long as an image can be printed on it.

Figure 2:
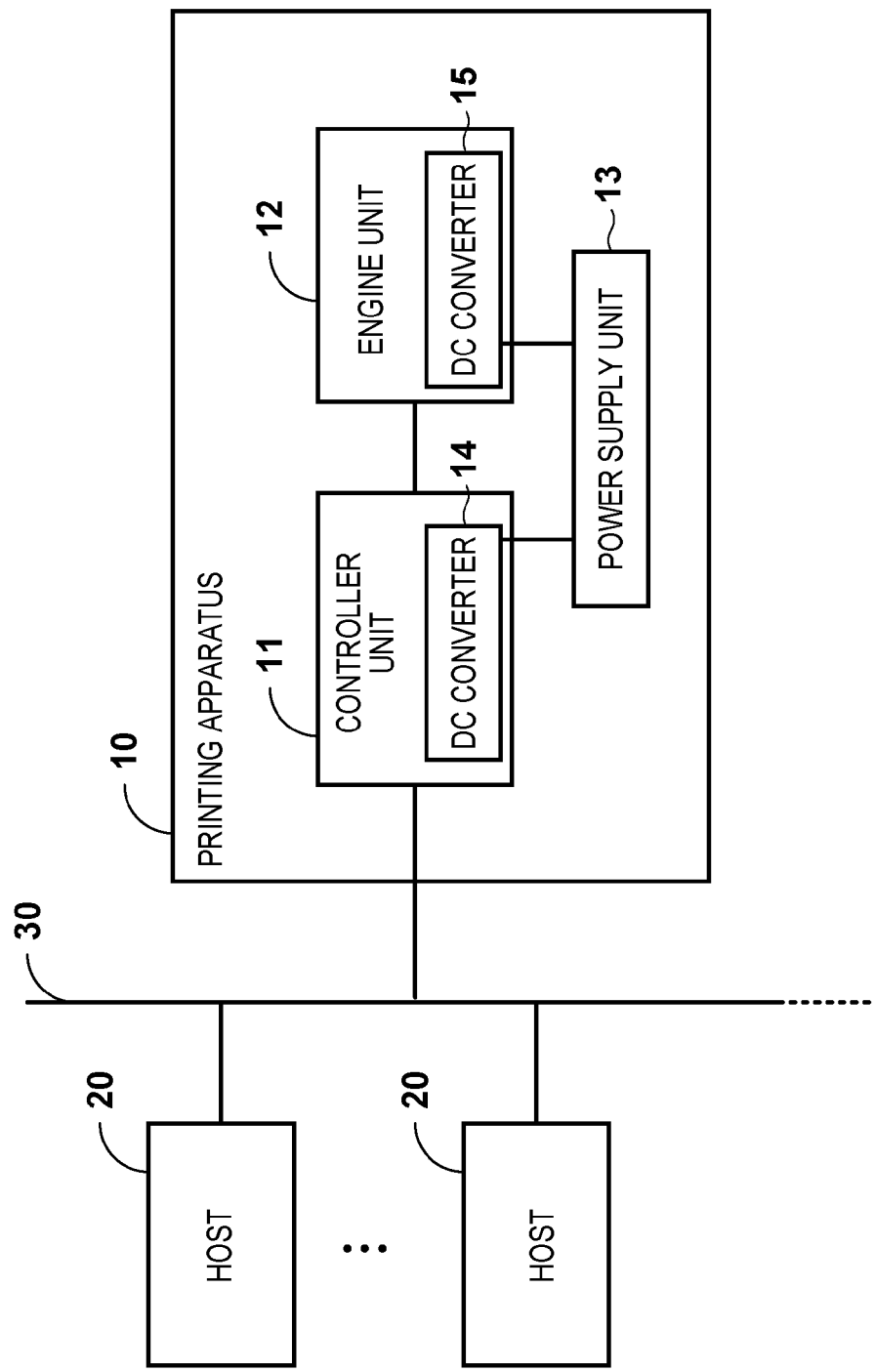
FIG. 2 is a diagram illustrating an example of a functional configuration of a printing apparatus 10 shown in FIG. 1.

FIG. 2 shows a diagram illustrating an example of a functional configuration of the printing apparatus 10 shown in FIG. 1.

Here, host apparatuses 20 each send print data or other data (e.g., various control signals) to the printing apparatus 10. The printing apparatus 10 receives various types of data from one or a plurality of host apparatuses 20 via a network 30. Note that the host apparatuses 20 and the printing apparatus 10 are not necessarily required to be connected via a network, and may be connected by, for example, Universal Serial Bus (USB), or IEEE 1394. They may be connected by wire or wirelessly.

Here, the configuration of the inside of the printing apparatus 10 can be roughly divided into a controller unit 11 and an engine unit 12. The printing apparatus 10 includes a power supply unit 13. The controller unit 11 includes a DC converter 14. The engine unit 12 includes a DC converter 15. The power supply unit 13 performs supply of power to the DC converter 14 and the DC converter 15.

The controller unit 11 performs overall control of the processing performed by the printing apparatus 10.

Specifically, the controller unit 11 performs processing such as those described below.

Control of the interface with the network 30 used for communications with the host apparatuses 20

Interpretation of print control commands sent from the host apparatuses 20 and generation of image data Compression and decompression processing of image data Various types of image processing performed when generating image data Sending commands to the engine unit 12 based on user's operations The engine unit 12 actually performs printing on the printing medium. In the engine unit 12, printing is performed based on image data generated by the controller unit 11.

Specifically, the engine unit 12 performs processing such as those described below.

Generation of data defining the discharge timing of the printhead

Print processing

Supply of ink to the printhead and recovery processing

Figure 3:
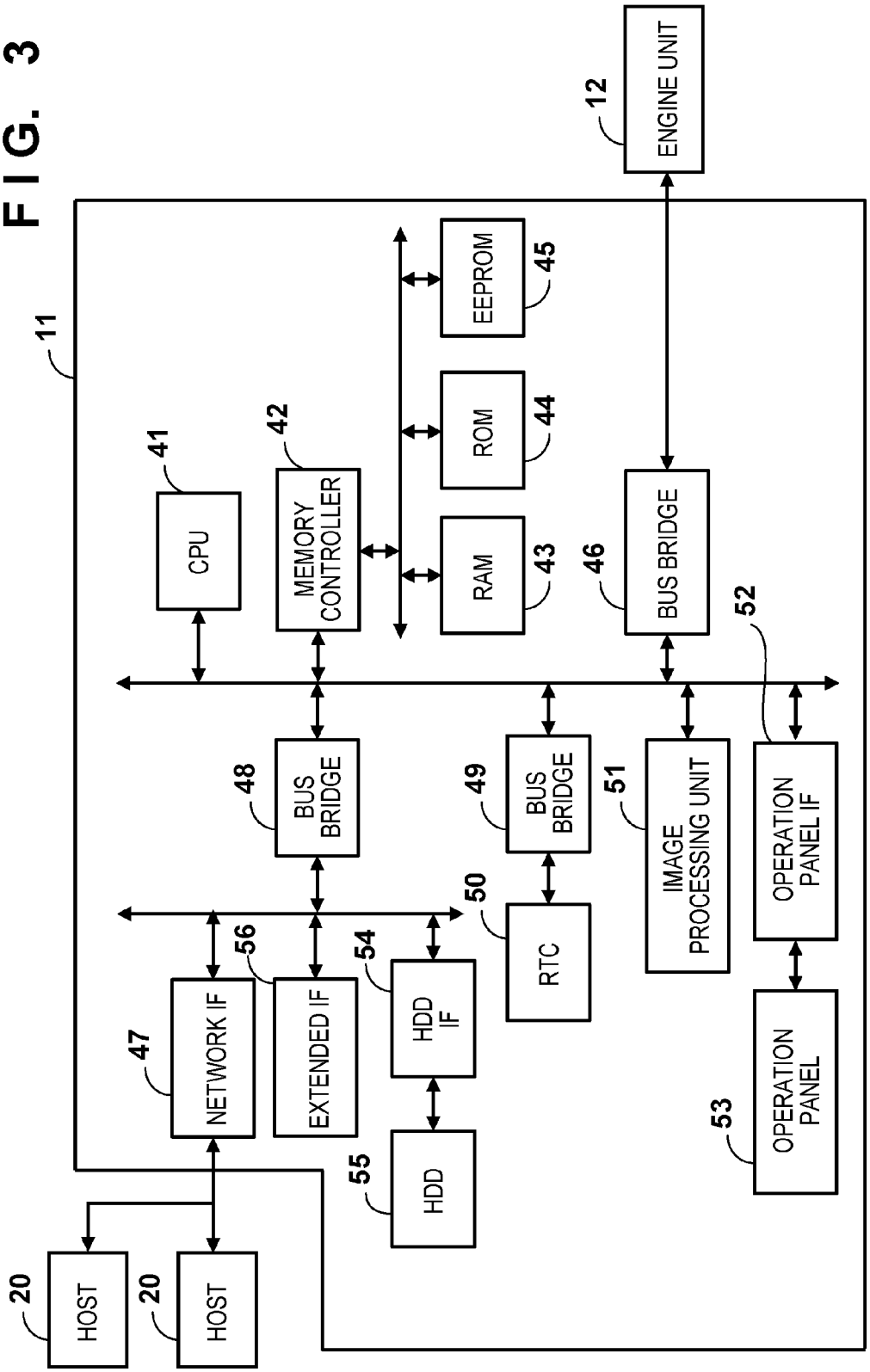
FIG. 3 is a diagram illustrating an example of a hardware configuration of a controller unit 11 shown in FIG. 2.

Conveyance of the printing medium, and control of the motor for operating the printhead An example of the hardware configuration of the controller unit 11 shown in FIG. 2 will be described below with reference to FIG. 3.

The controller unit 11 includes a CPU 41, a memory controller 42, a RAM 43, a ROM (read-only memory) 44, an EEPROM (electrically erasable programmable ROM) 45, and bus bridges 46, 48 and 49, a network IF 47, an RTC (real time clock) 50, and an image processing unit 51. In addition to these, the controller unit 11 also includes an operation panel 53, an operation panel IF 52, an HDD IF 54, an HDD 55, and an extended IF 56.

The ROM 44 stores control programs. The EEPROM 45 stores control programs and processing programs that can be updated, various types of constant data, and the like. The RAM 43 stores command signals and image information received from the host apparatuses 20. The CPU 41 controls the print operation based on the information stored in these memories via the memory controller 42.

The operation panel 53 is configured by various types of buttons and screens, and serves as a user interface. Various instructions given by the user via the operation panel 53 are input to the printing apparatus 10 via the operation panel IF 52, as instruction information. The instruction information is forwarded to the CPU 41 and the DC converter 14. Also, according to commands from the CPU 41, turning on and off of LEDs, display on the LCD, and the like of the operation panel 53 are controlled.

The bus bridge 46 sends image data to the engine unit 12, and also exchanges various commands and status information between the controller unit 11 and the engine unit 12, for example.

Various extension cards are connected to the extended IF 56. The HDD IF 54 is connected to the HDD 55. In the HDD 55, for example, print history information, print data, external characters, form images, emulation programs for interpreting print control languages based on different page description languages (PDLs) are stored. FIG. 12 is a diagram illustrating a configuration of the HDD 55 as an example of the storage device. The HDD 55 includes a storage medium driving unit 55a and a reading driving unit 55b. The storage medium driving unit 55a includes a mechanism for driving a storage medium on which data is written and from which data is read. The reading driving unit 55b includes a mechanism for driving a reading unit that reads out data.

The RTC 50 includes a timer function, and holds the time using a battery (not shown) of a different system from the power source of the main body of the printing apparatus. The CPU 41 is connected to the RTC 50 via the bus bridge 49, and obtains the time measured by the RTC 50.

The network IF 47 exchange data with one or a plurality of host apparatuses 20. The image processing unit 51 performs various types of image processing. For example, raster data generated by a host apparatus 20 is converted to image data (binarized data of each ink color). The image data is output to the engine unit 12 via the bus bridge 46.

Figure 4:
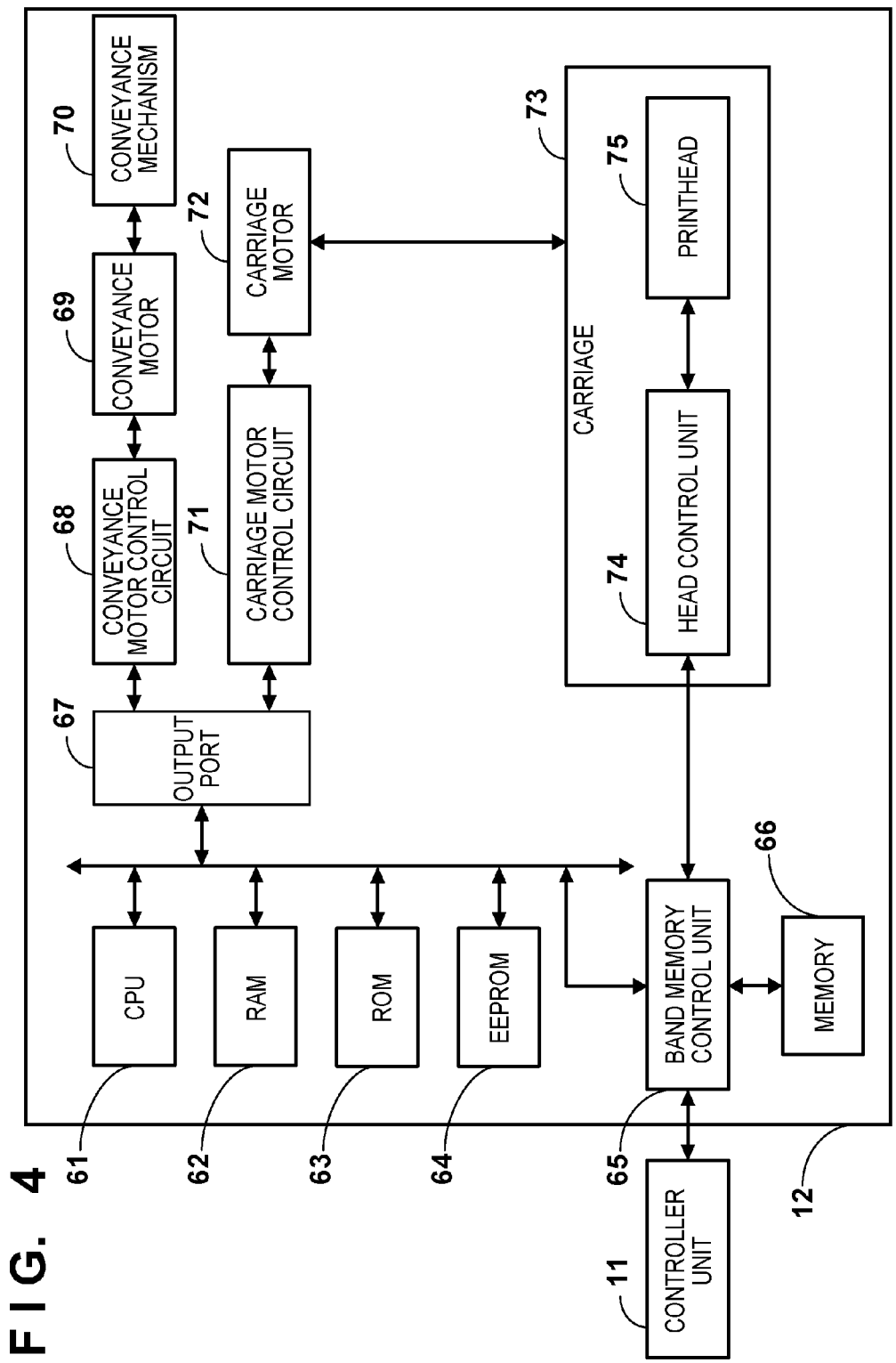
FIG. 4 is a diagram illustrating an example of a hardware configuration of an engine unit 12 shown in FIG. 2.

Next, an example of a hardware configuration of the engine unit 12 shown in FIG. 2 will be described with reference to FIG. 4.

The engine unit 12 includes a CPU 61, a RAM 62, a ROM 63, an EEPROM 64, a band memory control unit 65, a memory 66, an output port 67, a conveyance motor control circuit 68, a conveyance motor 69, and a conveyance mechanism 70. The engine unit 12 further includes a carriage motor control circuit 71, a carriage motor 72 and a carriage 73 that includes a head control unit 74 and a printhead 75.

The engine unit 12 is connected to the controller unit 11 via the band memory control unit 65. The ROM 63 stores control programs. The EEPROM 64 stores control programs and processing programs that can be updated, and various types of constant data, and the like. The RAM 62 stores command signals, image information and the like received from the controller unit 11. The CPU 61 controls the print operation based on the information stored in these memories.

The CPU 61 moves the carriage 73 by causing the carriage motor 72 to operate via the output port 67 and the carriage motor control circuit 71, for example. Also, the CPU 61 causes the conveyance mechanism 70 such as a conveyance roller to operate by causing the conveyance motor 69 to operate via the output port 67 and the conveyance motor control circuit 68, for example. In addition, the CPU 61 controls the band memory control unit 65 and the head control unit 74 based on various types of information stored in the RAM 62, and thereby drives the printhead 75. Through this control, an image is formed on a printing medium.

Figure 5:
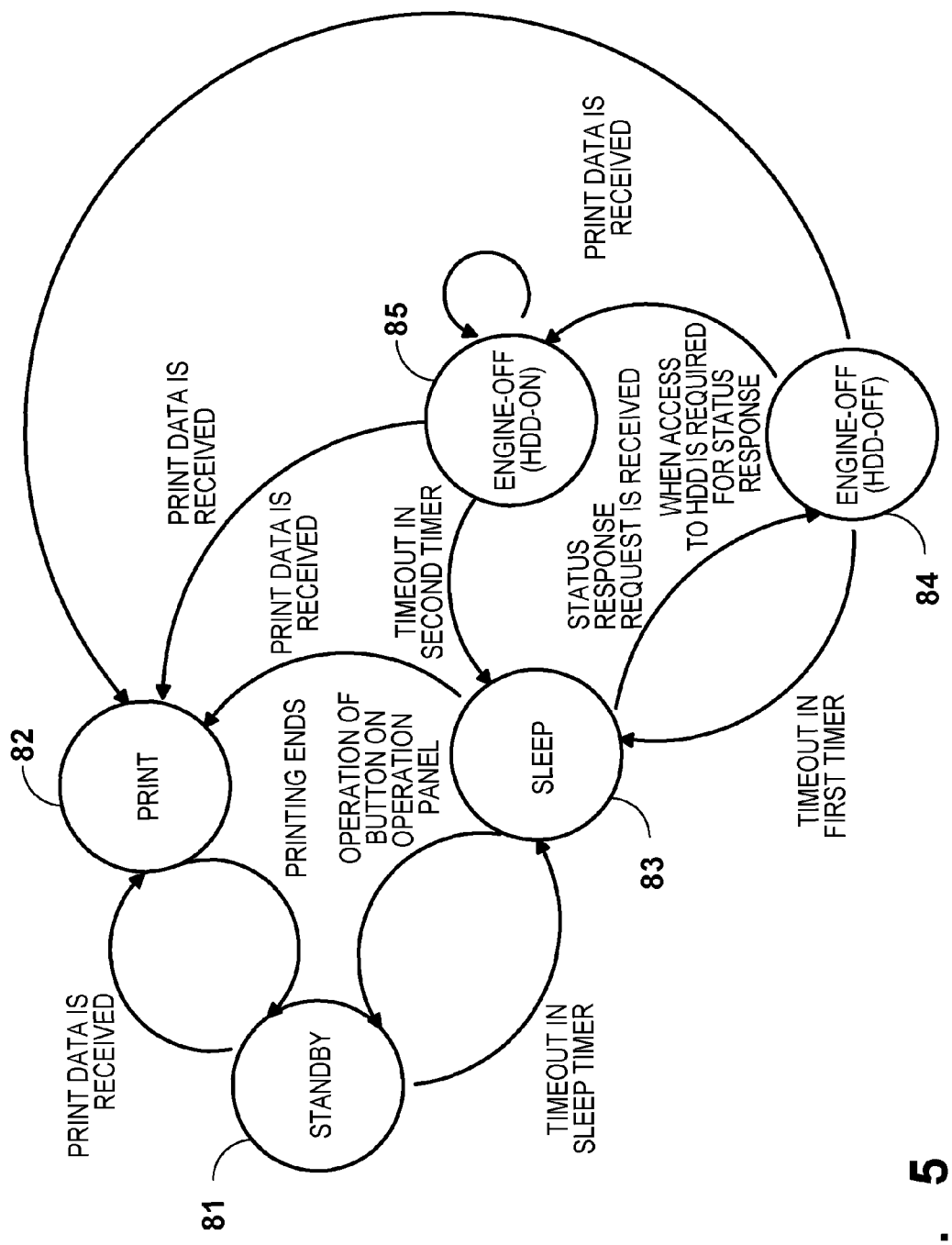
FIG. 5 is a diagram illustrating an example of power management control of the printing apparatus 10 shown in FIG. 1.

Next, power management control performed in the printing apparatus 10 shown in FIG. 1 will be described with reference to FIG. 5.

Here, the printing apparatus 10 of the present embodiment has five states, namely, a standby state 81, a print state 82, a sleep state 83, an engine-off (HDD-off) state 84 and an engine-off (HDD-on) state 85. The standby state 81 indicates a normal standby state, and the print state 82 indicates a state in which print processing is being executed. The sleep state 83 indicates a so-called low power consumption mode. The engine-off (HDD-off) state 84 indicates a state in which supply of power to the engine unit 12 by the DC converter 15 is stopped and supply of power to the HDD 55 by the DC converter 14 is stopped. The engine-off (HDD-on) state 85 indicates a state in which although supply of power to the engine unit 12 by the DC converter 15 is stopped, power is supplied to the HDD 55 from the DC converter 14. Note that the amount of power consumption in the printing apparatus 10 decreases in the order of the print state 82, the standby state 81, the engine-off (HDD-on) state 85, the engine-off (HDD-off) state 84 and the sleep state 83.

When a power source key on the operation panel 53 is pressed by the user in the sleep (power-off) state 83, the printing apparatus 10 performs an initialization process, and thereafter transitions to the standby state 81. In the standby state 81, all functional units in the printing apparatus 10 are in the operation state.

When print data is received from a host apparatus 20, the printing apparatus 10 transitions to the print state 82, and executes print processing. When the print processing ends the printing apparatus 10 again returns to the standby state 81.

Also, in the standby state 81, the printing apparatus 10 can immediately send the status in response to a request from the host apparatuses 20, and can immediately exchange data that is not print data with the host apparatuses 20.

Furthermore, in the standby state 81, the printing apparatus 10 causes a timer (sleep timer) to operate for measuring a period of time during which no print data has been received and the standby state is maintained. If the printing apparatus 10 has determined based on the sleep timer that no print data has been received (no print processing has been performed) for a preset period of time, it transitions to the sleep state 83 for reducing the power consumption.

In the sleep state 83, the printing apparatus 10 stops supply of power to the engine unit 12 for reducing the power consumption. At this time, the CPU 41 is set to a HALT state, the RAM 43 is set to a self-refreshing state, and supply of power to the HDD 55 is stopped. With respect to other units as well, supply of power is stopped, or the operation clock speed is reduced, for example.

Here, the network IF 47 is set such that reception of data from the host apparatus 20 can be detected even if the CPU 41 is in the HALT state. For example, if the network IF 47 and the bus bridge 48 are connected by a PCI bus, the network IF 47 is set to D3hot. In this manner, when reception of data from the host apparatus 20 has been detected, network IF 47 outputs a PME signal to the CPU 41. The CPU 41 transitions from the HALT state to a normal operation state based on the PME signal. Please note that the network IF 47 is capable of determining content of data received from the host apparatus 20.

When the printing apparatus 10 has received print data from the host apparatus 20 in the sleep state 83, it sets all of its functional units to the operation state. That is, the printing apparatus 10 transitions to the print state 82 and executes print processing.

Also, if the operation panel 53 is operated by the user in the sleep state 83, the printing apparatus 10 sets all of its functional units to the operation state. That is, the printing apparatus 10 transitions to the standby state 81 and receives input of the panel operation performed by the user.

When the printing apparatus 10 has received data that is not print data (a request for response about its status ("status response request") and the like) from the host apparatus 20 in the sleep state 83, the printing apparatus 10 transitions to the engine-off (HDD-off) state 84. In the engine-off (HDD-off) state 84, although supply of power to the engine unit 12 is still stopped, the printing apparatus 10 sets the CPU 41, the RAM 43 and the like to the normal operation state in order to exchange data with the host apparatuses 20. At this time, power is not supplied to the HDD 55.

After the CPU 41 transitions from the HALT state to the normal operation state, the CPU 41 controls the memory controller 42 and thereby the RAM 43 is set to a normal operation state by the memory controller 42. Thereafter, the printing apparatus 10 determines with the CPU 41 whether access to the HDD 55 is required due to data exchange with the host apparatuses 20. If it is determined that access to the HDD 55 is not required, the printing apparatus 10 responds to the request from the host apparatus 20 without performing any further operation. In contrast, if it is determined that access to the HDD 55 is required, the printing apparatus 10 transitions to the engine-off (HDD-on) state 85, supplies power to the HDD 55, obtains necessary information from the HDD 55, and thereafter, responds to the request from the host apparatus 20.

In the engine-off (HDD-off) state 84 and the engine-off (HDD-on) state 85, timers (a first timer and a second timer) operate in order to measure a period of time that has elapsed after data exchange with the host apparatus 20 has ended.

The first timer is used for measuring the elapsed time in the engine-off (HDD-off) state 84. The second timer is used for measuring the elapsed time in the engine-off (HDD-on) state 85. If the period of time measured by the first timer or the second timer has reached a preset period of time, the printing apparatus 10 transitions to the sleep state 83.

Both in the engine-off (HDD-off) state 84 or in the engine-off (HDD-on) state 85, if the printing apparatus 10 has received print data from a host apparatus 20, it transitions to the print state 82 and executes print processing.

Figure 6:
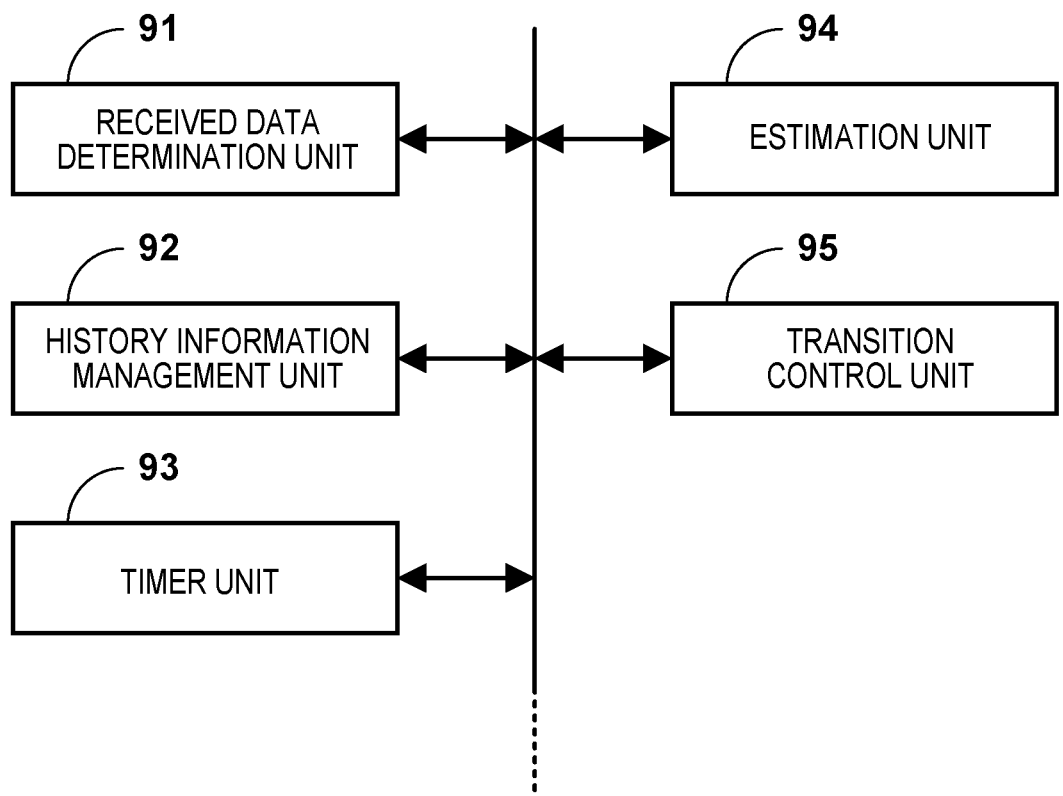
FIG. 6 is a diagram illustrating an example of a functional configuration of the controller unit 11 shown in FIG. 3.

Next, an example of the functional configuration of the controller unit 11 shown in FIG. 3 will be described with reference to FIG. 6. Note that the configuration shown in FIG. 6 is realized by, for example, the CPU 41 executing the control program stored in the ROM 44 or the like. Needless to say, part of or the entire configuration shown in FIG. 6 may be realized by a dedicated hardware circuit.

The controller unit 11 includes, as its functional units, a received data determination unit 91, a history information management unit 92, a timer unit 93, an estimation unit 94, and a transition control unit 95.

The received data determination unit 91 performs determination on data received from one or a plurality of host apparatuses 20. More specifically, it is determined whether the received data is print data, and if it is not print data, it is further determined according to the received data whether the received data requires access to the HDD 55.

The history information management unit 92 manages history information relating to reception of data that has been determined to require access to the HDD 55. The history information is managed using, for example, the RAM 43 or the EEPROM 45. The configuration of the history information will be described in detail below (see FIG. 11 to be described below).

The timer unit 93 performs time measurement of various timers using the RTC 50. The timer unit 93 starts time measurement by the first timer after the printing apparatus 10 has transitioned to the engine-off (HDD-off) state 84, for example. Also, the timer unit 93 starts time measurement by the second timer after the printing apparatus 10 has transitioned to the engine-off (HDD-on) state 85, for example. In addition, the timer unit 93 also performs time measurement by a sleep timer.

The estimation unit 94 calculates a period of time (estimation time) until next reception of data that requires access to the HDD 55, in the case where timeout occurs in the second timer in the engine-off (HDD-on) state 85. This calculation is performed based on the history information managed by the history information management unit 92.

The transition control unit 95 controls transition of the operation states of the printing apparatus 10. For example, the transition control unit 95 causes the operation state of the printing apparatus 10 to transition from the engine-off (HDD-on) state 85 to the sleep state 83. Next, an example of a flow of processing performed by the printing apparatus 10 shown in FIG. 1 will be described with reference to FIG. 7. Here, the operation performed when transition from the engine-off (HDD-off) state 84 to the sleep state 83 is performed will be described.

The printing apparatus 10 receives the status response request from a host apparatus 20 via the network IF 47 or the like. Then, it is assumed that the received data determination unit 91 has determined that access to the HDD 55 is required in order to respond to the request. In this case, the printing apparatus 10 starts supplying power to the HDD 55 (step S101).

After it has become possible to access the HDD 55, the printing apparatus 10 reads out necessary information from the HDD 55 with the CPU 41, and sends response data that responds to the status response request to the host apparatus 20 via the network IF 47 (step S102).

Here, the printing apparatus 10 sets, in the timer unit 93, a predetermined initial value to the second timer (step S103), and starts time measurement by the second timer (step S104). This initial value will be described in detail below, and the initial value is decided based on production specifications of the printing apparatus 10 and the HDD 55 (durability (guarantee) period, guarantee period, and the like).

After that, if timeout has occurred in the second timer ("YES" in step S105), the printing apparatus 10 estimates, in estimation unit 94, a period of time until next reception from the host apparatus 20 of the status response request that requires access to the HDD 55 (step S106). In this estimation, the host apparatus that sends the status response request and the type of the response status are also estimated.

Then, the printing apparatus 10 compares, in the transition control unit 95, the estimated time (the estimation time) with a predetermined threshold. The predetermined threshold will be described in detail below, and the threshold is decided based on the amount of power consumption for the spinup operation (start-up) of the storage medium driving unit 55a of the HDD 55. Note that this threshold may be decided based on the amounts of power consumption of both the storage medium driving unit 55a and the reading driving unit 55b.

If the estimation time exceeds the threshold as a result of the comparison ("YES" in step S107), the printing apparatus 10 transitions to the sleep state 83. In contrast, if the estimation time does not exceed the threshold ("NO" in step S107), in the timer unit 93 of the printing apparatus 10, the estimation time is set in the second timer (step S108), and starts time measurement by the second timer (step S109). If timeout has occurred in the second timer ("YES" in step S110), the printing apparatus 10 determines, in the received data determination unit 91, whether the same status response request as that estimated in the processing in step S106 (the same host apparatus that sends the request and the same status type) has already been received or a response to that request has already been sent.

If the estimated status response request has been received or a response to that request has been sent ("YES" in step S111), the printing apparatus 10 calculates, in the estimation unit 94, the estimation time as described above (step S112). Thereafter, the printing apparatus 10 compares, in the transition control unit 95, the estimation time with a predetermined threshold. If the estimation time exceeds a threshold ("YES" in step S113), the printing apparatus 10 transitions to the sleep state 83 (step S114). If the estimation time does not exceed the threshold ("NO" in step S113), the procedure returns to the processing in step S108.

Figure 8:
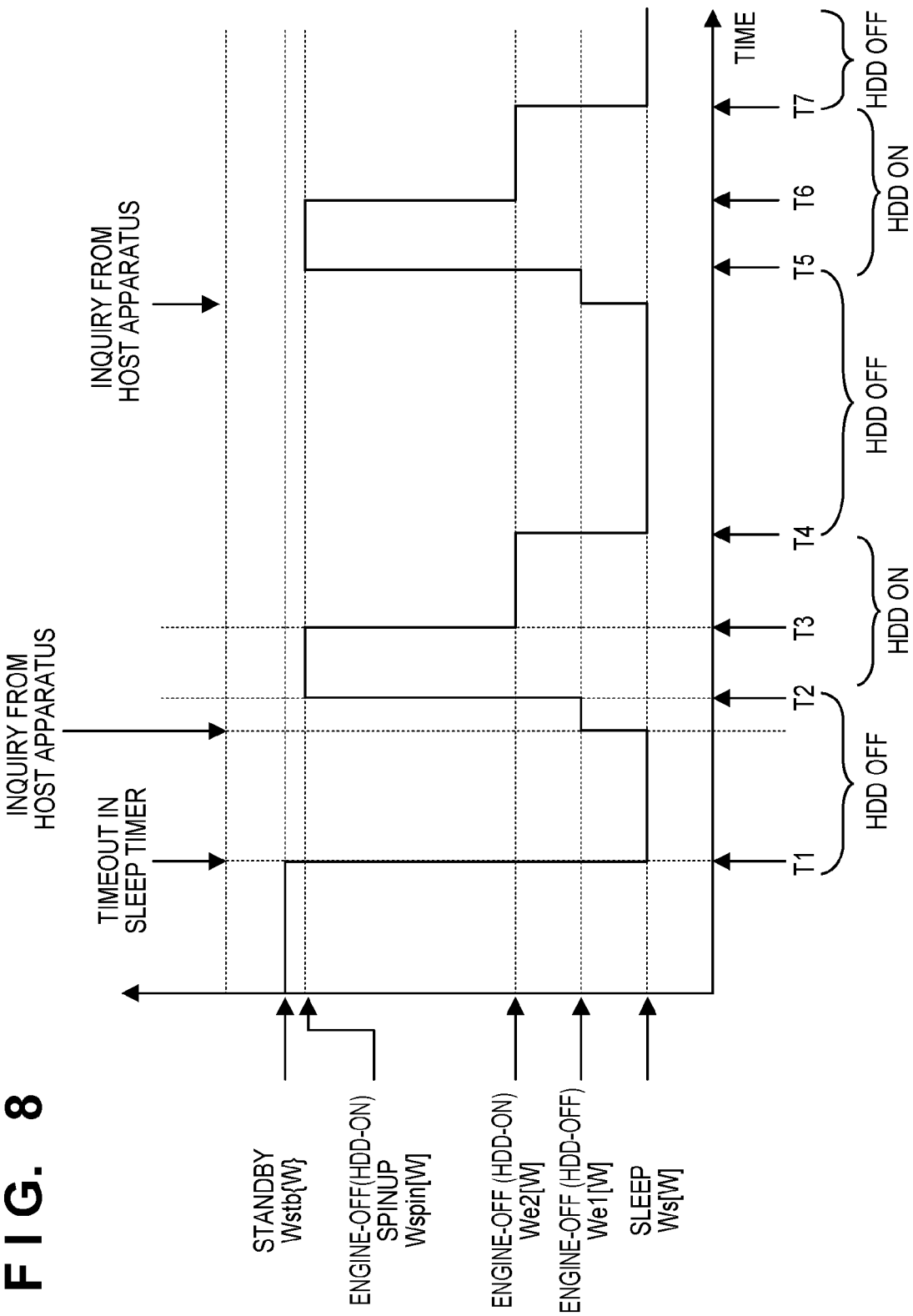
FIG. 8 is a diagram illustrating an example of transition of the power consumption of the printing apparatus 10 shown in FIG. 1.

Now, an example of transition in the power consumption in the printing apparatus 10 shown in FIG. 1 will be described with reference to FIG. 8.

The printing apparatus 10 maintains the standby state 81 until timeout occurs in the sleep timer. In the standby state 81, all the functional units in the printing apparatus 10 are in the operable state. Therefore, in the standby state 81, the next-largest amount of power is consumed after the print state 82.

At time T1, timeout occurs in the sleep timer and the printing apparatus 10 transitions to the sleep state 83. In the sleep state 83, the printing apparatus 10 consumes the smallest amount of power.

Here, when the printing apparatus 10 has received a status response request that requires access to the HDD 55 from the host apparatus 20, the printing apparatus 10 transitions to the engine-off (HDD-off) state 84. Then, it is determined in the transition control unit 95 whether access to the HDD 55 is required. Note that the determination in the engine-off (HDD-off) state 84 is performed in an extremely short period of time, and thus can be ignored. However, in order to make the description easier to understand, a certain amount of time is allocated for the determination in FIG. 8.

Here, it is assumed that it has been determined that access to the HDD 55 is required. In this case, the printing apparatus 10 transitions to the engine-off (HDD-on) state 85 at time T2, and starts supplying power to the HDD 55. When supply of power is started, the HDD 55 starts initialization and rotates its disk. During the spinup period (period from T2 to T3) during which the rotation of the disk is stabilized, a large amount of power consumption is required thus temporarily increasing the power consumption. For this reason, the power consumption per unit time in the printing apparatus 10 is Wspin during a predetermined period. Note that after time T3, the rotation of the disk becomes stable and the power consumption drops. As a result, the power consumption per unit time in the printing apparatus 10 drops to We2.

In the case where the initial value set in the second timer is reached and thus timeout occurs in the second timer, the printing apparatus 10 compares the estimation time with the threshold in the transition control unit 95, as described above. Here, it is assumed that it has been determined that the estimation time exceeds the threshold. Therefore, the printing apparatus 10 again transitions to the sleep state 83 at time T4. In this manner, the power consumption of the printing apparatus 10 drops to Ws. Thereafter, the operation state of the printing apparatus 10 is changed as appropriate in a similar manner, and thereby reduction of the power consumption is achieved.

Figure 7:
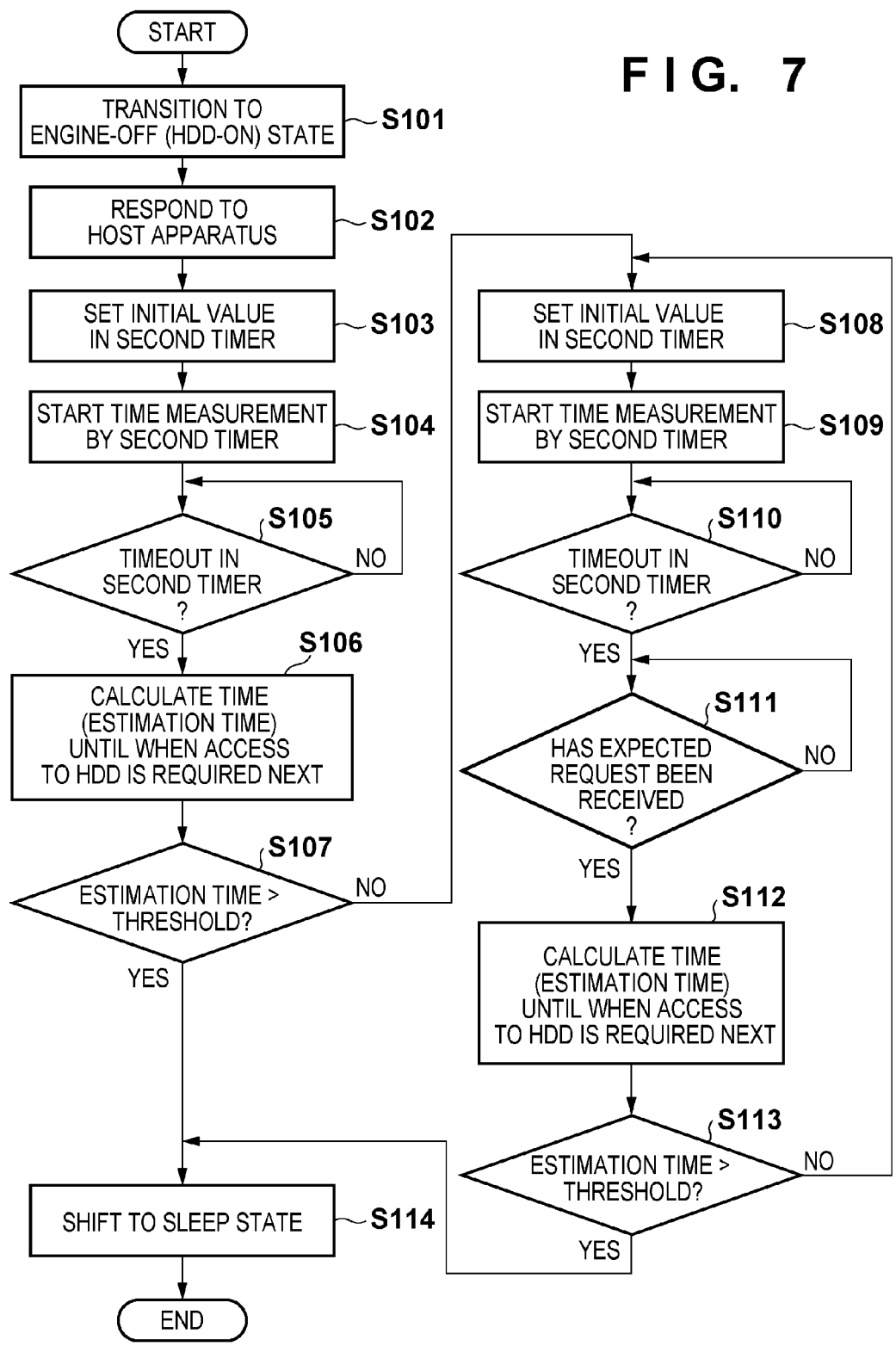
FIG. 7 is a flowchart illustrating an example of a flow of processing performed by the printing apparatus 10 shown in FIG. 1.

Next, the initial value that is set in the second timer (the timer used for measuring the elapsed time in the engine-off (HDD-on) state 85) shown in step S103 in FIG. 7 will be described.

For the HDD 55, the number of times guaranteed for its operation (the guaranteed number of times) is generally determined, for example, the number of times the head can be loaded on disk media and the number of times the head can be retreated (unloaded) from disk media. Also for the printing apparatus 10, the guarantee period during which its operation is guaranteed is determined.

Here, when the initial value in the second timer is set to a small value, the number of times the HDD 55 is turned on and off increases, and the number of times the head is loaded and unloaded may exceed the guaranteed number of times within the guarantee period of the printing apparatus 10.

Therefore, in the second timer, a value is set that is larger than or equal to the value that is obtained by dividing the guarantee period of the printing apparatus 10 by the guaranteed number of times of loading and unloading in the HDD 55. Specifically, the guaranteed number of times the head of the HDD 55 can be loaded and unloaded is indicated by "N", the guarantee period of the printing apparatus 10 is indicated by "H", and the value for the second timer is set to be larger than or equal to the value obtained by H/N.

By setting such a value in the second timer, it is possible to reduce the possibility that the guaranteed number of times the head of the HDD 55 can be loaded and unloaded will be exceeded within the guarantee period of the printing apparatus 10. That is, in the printing apparatus 10, turning on and off of the HDD 55 are repeated upon transition to the sleep state 83 and the like in order to reduce the power consumption, and the initial value serving as the smallest value of the current application period that is required for each instance of turning on and off is set to at least H/N. In this manner, it is possible to prevent the number of times the head is loaded and unloaded from exceeding the guaranteed number of times within the guarantee period of the printing apparatus 10.

For example, it is assumed that the guaranteed number of times the head of the HDD 55 can be loaded and unloaded is 600,000 times, and the guarantee period of the printing apparatus 10 is ten years (assuming that it is operated eight hours per day and 20 days per month).

In this case, H/N is obtained as described below.

$$H/N = \frac{(8 \text{ [h]} \times 20 \text{ [days]} \times 12 \text{ [months]} \times 10 \text{ [years]})}{600,000 \text{ [times]}}$$

$$= 14400/600000$$

$$= 0.024 \text{ [h/times]}$$

$$\approx 116 \text{ [sec/time]}$$

Therefore, under the assumed conditions described above, if the initial value is set to, for example, 120 seconds, it is possible to perform control so as not to exceed the guaranteed number of times the head of the HDD 55 can be loaded and unloaded within the guarantee period of the printing apparatus 10.

Figure 9:
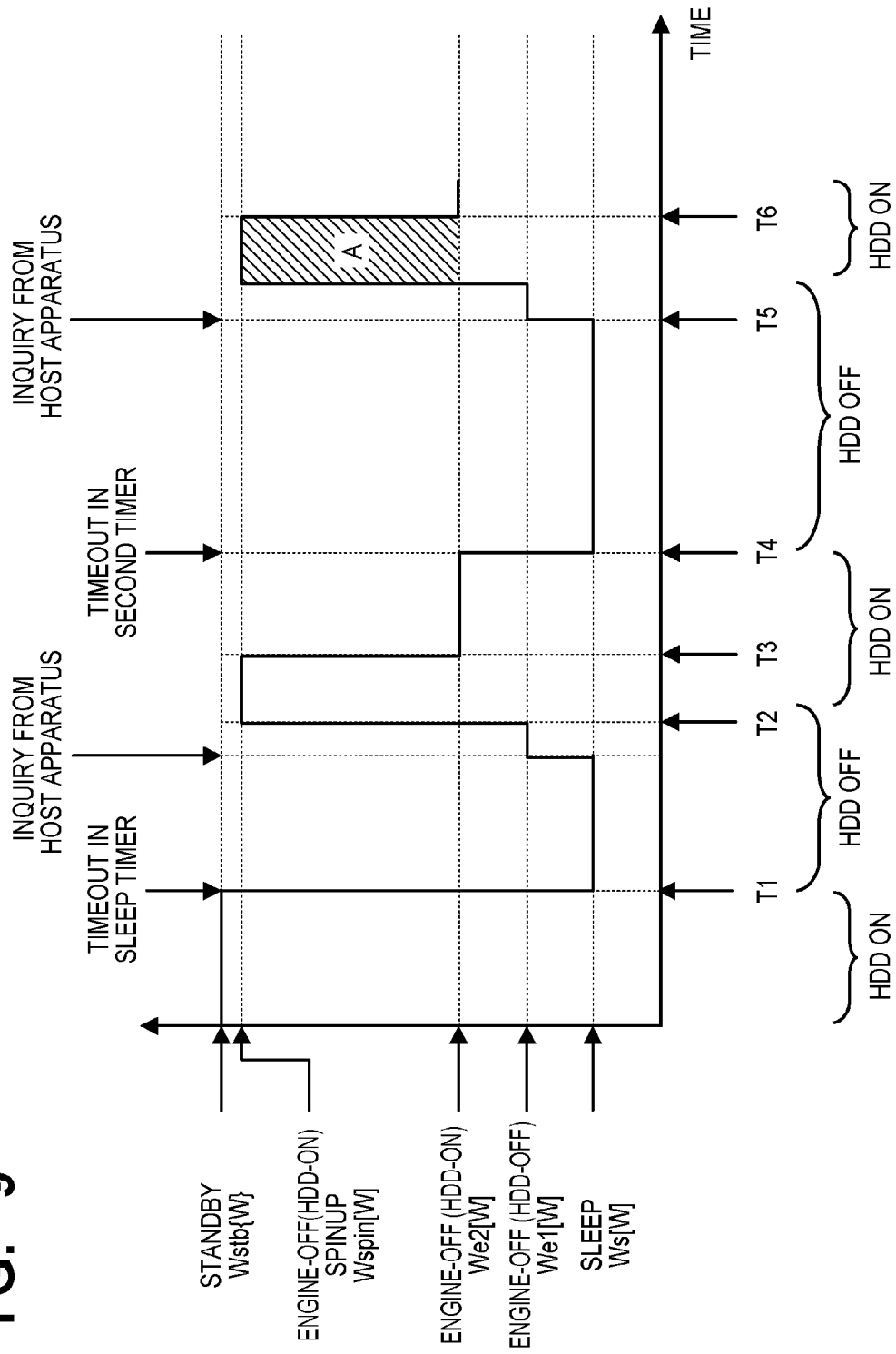
FIG. 9 is a diagram illustrating an example of transition of the power consumption of the printing apparatus 10 shown in FIG. 1.
Figure 10:
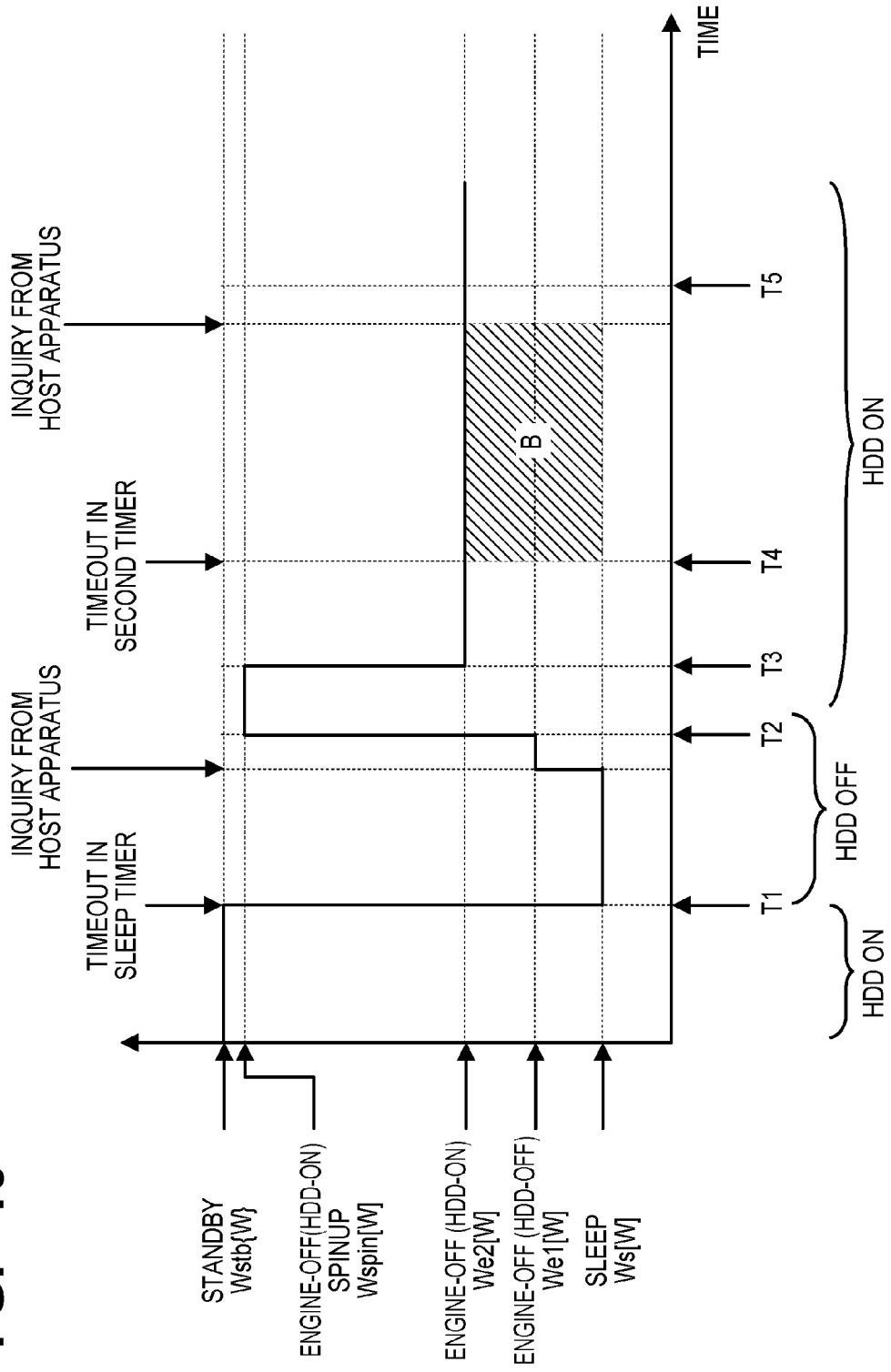
FIG. 10 is a diagram illustrating an example of transition of the power consumption of the printing apparatus 10 shown in FIG. 1.

Next, the predetermined threshold used in the second timer shown in step S107 and the like in FIG. 7 will be described. FIGS. 9 and 10 each show an example of transition of the power consumption of the printing apparatus 10 shown in FIG. 1. FIG. 9 illustrates a case in which it is determined that the estimation time (period from time T4 to time T5) exceeds the predetermined threshold at time T4. FIG. 10 illustrates a case in which it is determined that the estimation time (period from time T4 to time T5) does not exceed the predetermined threshold at time T4. Note that the estimation time indicates, as described above, a period of time until next reception of the status response request that requires access to the HDD 55.

In the case of FIG. 10, since it has been determined at time T4 that the estimation time (period from time T4 to time T5) does not exceed the threshold, the engine-off (HDD-on) state is maintained until time T5.

In the case of FIG. 9, since the printing apparatus 10 is in the sleep state from time T4 to time T5, as compared to FIG. 10, the power consumption of the printing apparatus 10 can be reduced by the amount indicated by the hatching B in FIG. 10.

In contrast, in the case of FIG. 10, the HDD 55 remains to be turned on from time T4 to time T5. Thus, as compared to FIG. 9, the power consumption amount required for the spinup operation, which is indicated by the hatching A in FIG. 9, can be reduced.

Accordingly, if the amount of power indicated by the hatching A is smaller than the amount of power indicated by the hatching B, the power consumption amount of the printing apparatus 10 can be reduced more if the printing apparatus 10 is caused to transition to the sleep state during the period from time T4 to time T5. In contrast, if the amount of power indicated by the hatching A is larger than the amount of power indicated by the hatching B, the power consumption amount of the printing apparatus 10 can be reduced more if the printing apparatus 10 is kept in the engine-off (HDD-on) state during the period from time T4 to time T5.

Therefore, a value with which the amount of power indicated by the hatching A and the amount of power indicated by the hatching B are equal is set as the predetermined threshold. Here, the time required for the spinup operation (period from time T2 to time T3, and period from time T5 to time T6) is indicated by Ts.

In this case, the amount of power indicated by the hatching A can be obtained as indicated below.

$$(W\text{spin} - We2) \times Ts$$

Also, when the estimation time (period from time T4 to time T5) is indicated by T, the amount of power indicated by the hatching B can be obtained as indicated below.

$$(We2 - Ws) \times T$$

As described above, in the engine-off (HDD-off) state, a determination as to whether access to the HDD 55 is required is made in an extremely short period of time, which can be ignored. Therefore, the period after a status response request has been received until power is supplied to the HDD 55 (period from the point "inquiry from a host apparatus" to "T5" in the drawing) is assumed to be "0".

Accordingly, T serving as the threshold is obtained as follows.

$$T = (W\text{spin} - We2) \times Ts/(We2 - Ws)$$

Here, consider the case where the printing apparatus 10 uses an HDD that requires four seconds (Ts) for the spinup operation. It is also assumed that the power consumption of the printing apparatus 10 is 15.6 W during the spinup operation (Wspin), 5.6 W in the engine-off (HDD-on) state (We2), and 3.8 W at the sleep state (Ws).

In this case, T serving as the threshold is about 23 seconds. Efficient power control is possible by the printing apparatus 10 transitioning to the sleep state at time T4 if the estimation time exceeds 23 seconds, and the printing apparatus 10 remaining in the engine-off (HDD-on) state if the estimation time does not exceed 23 seconds.

Next, a method for estimating the estimation time and the like in steps S106 and S112 shown in FIG. 7 will be described. As described above, in this processing, in addition to the estimation time, the host apparatus that has sent the request and the type of response status are also estimated.

As described in relation to conventional techniques, data that is not print data is also exchanged between the printing apparatus and the host apparatuses for achieving improved operability, efficient operation of the printing apparatus, and the like.

Examples of such other data include data listed below.

Status information and remote setting information used for managing the printing apparatus with the status monitor Status information and remote setting information used for managing the printing apparatus using the printer MIB Print history information for, for example, calculating the cost of print operation using a device agent, the information including the amount of ink used, the amount of printing media used, the host that has requested printing, and the like of each print data.

Generally, while various types of information such as the status information and the remote setting information are stored in one of the RAM, the EEPROM and the HDD, the print history information is stored in the HDD such that a large amount of information can be stored.

Also, in the case of exchanging data that is not print data, the access destination in the printing apparatus differs according to content of access. Therefore, the communication protocol and the port number are determined according to the content of access. Therefore, if there is access from a host apparatus 20, content of the access (type of response status) can be determined from the communication protocol and the port number of the access.

Furthermore, exchange of data that is not print data is performed regularly and mainly by programs in the host apparatus 20. Furthermore, the cycle of data exchange differs for each program.

Based on the description given thus far, in order to estimate a period of time until next reception of the status response request that requires access to the HDD 55, it is sufficient that at least two reception times are held for each set of the host apparatus 20 that has accessed the HDD 55, and the communication protocol and the port number corresponding to the access.

The history information with respect to reception of the status response request may be updated each time a status response request is received. Otherwise, when a host apparatus 20 is turned on or an application for performing data exchange is activated, the communication protocol and the access cycle may be notified to the printing apparatus 10.

In addition, if no status response request has been received within a period of time during which next reception of the status response request is estimated, it is possible that the host apparatus 20 is turned off, or the application for performing data exchange on the host apparatus 20 has been ended. Therefore, if no status response request has been received within the estimation time, the printing apparatus 10 may discard, in the history information management unit 92, the information corresponding to that estimation time from the history information. Otherwise, when the host apparatus is turned off or the application for exchanging data is ended, the corresponding host apparatus or application may notify the printing apparatus 10 of information instructing to discard the information corresponding thereto. In this case, the printing apparatus 10 discards, in the history information management unit 92, information corresponding to the notification from the history information.

FIG. 11 is a diagram illustrating an example of the history information. As the history information, information relating to host apparatuses 20 that have sent data that is not print data to the printing apparatus 10 is managed. Specifically, the access times are managed in association with the IP address, the protocol and the port number.

Here, the IP address is used as identification information for identifying the host apparatuses 20. For this reason, the computer name (host name) or the like may be used instead of the IP address. Also, the protocol and the port number are used as information indicating content of access to the printing apparatus 10. In the column "access time 1", the latest time of data reception from a host apparatus 20 is held. Also in the column "access time 2", the second-latest time of data reception from the host apparatus 20 is held. Note that the access time 1 and the access time 2 are not required to hold the latest and the second-latest time of data reception. For example, the third-latest, fourth-latest and fifth-latest times of data reception may be held. With the information described above, the printing apparatus 10 calculates the estimation time for each set of information pieces that are managed in association with each other.

In the case of the example shown in FIG. 11, with respect to the access from the host apparatus having the IP address "192.168.0.10" with the communication protocol "TCP" and the port number "10000", "13:31" and "13:36" are held as access times. Therefore, it is possible to estimate that the next access time is "13:41".

Similarly, with respect to the access from the host apparatus having the IP address "192.168.0.10" with the communication protocol "TCP" and the port number "10001", it is possible to estimate that the next access time is "13:40". Also, with respect to the access from the host apparatus having the IP address "192.168.0.11" with the communication protocol "TCP" and the port number "10000", it is possible to estimate that the next access time is "13:43".

As described above, according to the present embodiment, H/N is set as the initial value for the second timer (transition determination time) and time measurement by the second timer is started upon transition to the engine-off (HDD-on) state. When timeout has occurred in the second timer, whether or not to cause the printing apparatus to transition to the sleep state (low power consumption mode) is determined. Transition control of the operation state of the printing apparatus is performed at this timing, and thus it is possible to prevent the guarantee period of the HDD from expiring before expiration of the guarantee period (product life) of the printing apparatus.

Also, the estimation time until next reception of the status response request that requires access to the HDD is compared with a predetermined threshold $(Wspin-W1) \times Ts/(W1-W2)$, and thereby whether or not to cause the printing apparatus to transition to the sleep state (low power consumption mode) is be determined. In this manner, power saving control can be performed while taking the power consumption characteristics of the HDD into account. That is, it is possible to suppress increase in the power consumption due to start-up of the HDD (spinup operation of the HDD). Note that W1 corresponds to the above-described We2, and indicates the power consumption per unit time of the printing apparatus in the engine-off (HDD-on) state. Also, W2 corresponds to the above-described Ws, and indicates the power consumption per unit time of the printing apparatus in the sleep state.

Also, when a status response request that requires access to the HDD is received from the host apparatus, at least two access times are held for each set of the host apparatus, the communication protocol and the port number. Therefore, it is possible to estimate a period of time until next reception of the status response request that requires access to the HDD.

This is the end of the description of typical embodiments of the present invention. The present invention is not limited to the embodiments that are described above or shown in the drawings, but may be implemented by making appropriate modifications without changing the gist of the invention.

For example, in the embodiments described above, a case was described in which the above-described transition control is performed when transition from the engine-off (HDD-on) state to the sleep state (low power consumption mode) is performed. However, this is not a limitation. It is sufficient that the above-described transition control is performed when the HDD transitions from the on state (first operation state) to the off state (second operation state) in a state in which the power consumption is lower than that in the normal operation. For example, the above-described transition control may be performed when transition from the engine-off (HDD-on) state to the engine-off (HDD-off) state is performed.

Also, in the above-described embodiments, the printing apparatus of the inkjet type was described as an example. However, the printing apparatus is not limited to this, and any printing apparatus can be used if it includes an HDD, and the printing apparatus employing any printing type can be used. For example, an electrophotographic printing apparatus may be used. Also, the storage device is not limited to the HDD 55, and the present invention can be applied to a storage including a unit for driving a storage medium and a unit for driving a reading unit, or other storages regardless of, for example, the storage principle of the storage medium or the method for reading the storage medium. For example, the present invention can be applied to storages that employ the DVD system and the CD system.

As described above, with the present invention, in the printing apparatus in which a storage such as an HDD is mounted, it is possible to reduce the power consumption while taking the product specifications and power consumption characteristics of the storage into account.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283724, filed Dec. 20, 2010 which is hereby incorporated by reference herein in its entirety.

What is claimed is:

1. A printing apparatus comprising:
a storage unit;
a driving unit for driving the storage unit;
a first determination unit configured to, in a case where first data that is not print data is received, determine whether or not access to the storage unit is required with reception of the first data;
a control unit configured to cause the printing apparatus to execute transition from a sleep state to a first operation state in a case where the first determination unit determined that the access to the storage unit is required with reception of the first data, wherein power consumption of the first operation state is lower than power consumption of a normal operation state and the storage unit is turned on in the first operation state, and wherein power consumption of the sleep state is lower than power consumption of the first operation state;
a reception unit configured to receive second data which requires access to the storage unit;
a history information management unit configured to manage a first history information relating to time of reception of the first data and a second history information relating to time of reception of the second data; and
an estimation unit configured to calculate an estimation time which is a period of time until a next reception of data that requires access to the storage unit, based on a difference between the first history information and the second history information,
wherein the control unit causes the printing apparatus to execute transition from the first operation state to a second operation state in a case where the estimation time exceeds a threshold of a period of time decided based on an amount of power consumption for driving the driving unit, wherein power consumption of the second operation state is lower than that in the normal operation and the storage device is turned off in the second operation state,
wherein the control unit causes the printing apparatus to maintain in the first operation state in a case where the estimation time does not exceed the threshold.

2. The printing apparatus according to claim 1, wherein the storage unit comprises a hard disk.

3. The printing apparatus according to claim 1, wherein the threshold of a period of time is obtained by an expression below:

$$(W\text{spin} - W1) \times Ts / (W1 - W2)$$

where Wspin is power consumption of the printing apparatus per unit time during start-up of the driving unit, W1 is power consumption of the printing apparatus per unit time in the first operation state, W2 is power consumption of the printing apparatus per unit time in the second operation state, and Ts is a period of time for starting up the driving unit.

4. A method for controlling a printing apparatus comprising:
determining, in a case where first data that is not print data is received, whether or not access to a storage unit, which is driven by a driving unit, is required with reception of the first data;
causing the printing apparatus to execute transition from a sleep state to a first operation state in a case where it is determined that the access to the storage unit is required with reception of the first data, wherein power consumption of the first operation state is lower than power consumption of a normal operation state and the storage unit is turned on in the first operation state, and wherein power consumption of the sleep state is lower than power consumption of the first operation state;
receiving second data which requires access to the storage unit;
managing a first history information relating to time of reception of the first data and a second history information relating to time of reception of the second data;
calculating an estimation time which is a period of time until a next reception of data that requires access to the storage unit, based on a difference between the first history information and the second history information; and
causing the printing apparatus to execute transition from the first operation state to a second operation state in a case where the estimation time exceeds a threshold of a period of time decided based on an amount of power consumption for driving the driving unit, wherein power consumption of the second operation state is lower than that of the normal operation state and the storage unit is turned off in the second operation state, and causing the printing apparatus to maintain in the first operation state in a case where the estimation time does not exceed the threshold.

5. The method according to claim 4, wherein the storage unit comprises a hard disk.

6. The method according to claim 4, wherein the threshold of a period of time is obtained by an expression below:

$$(W\text{spin} - W1) \times Ts / (W1 - W2)$$

where Wspin is power consumption of the printing apparatus per unit time during start-up of the driving unit, W1 is power consumption of the printing method per unit time in the first operation state, W2 is power consumption of the printing method per unit time in the second operation state, and Ts is a period of time for starting up the driving unit.

7. A non-transitory computer-readable storage medium storing a program for causing a computer in an information processing apparatus to execute a method for controlling a printing apparatus, the method comprising:

determining, in a case where first data that is not print data is received, whether or not access to a storage unit, which is driven by a driving unit, is required with reception of the first data;

causing the printing apparatus to execute transition from a sleep state to a first operation state in a case where it is determined that access to the storage unit is required with reception of the first data is determined, wherein power consumption of the first operation state is lower than power consumption of a normal operation state and the storage unit is turned on in the first operation state, and wherein power consumption of the sleep state is lower than power consumption of the first operation state;

receiving second data which requires access to the storage unit;

managing a first history information relating to time of reception of the first data and a second history information relating to time of reception of the second data;

calculating an estimation time which is a period of time until a next reception of data that requires access to the storage unit, based on a difference between the first history information and the second history information; and causing the printing apparatus to execute transition from the first operation state to a second operation state in a case where the estimation time exceeds a threshold of a period of time decided based on an amount of power consumption for driving the driving unit, wherein power consumption of the second operation state is lower than that of the normal operation state and the storage unit is turned off in the second operation state, and causing the printing apparatus to maintain in the first operation state in a case where the estimation time does not exceed the threshold.

8. The non-transitory computer-readable storage medium according to claim 7, wherein the storage unit comprises a hard disk.

9. The non-transitory computer-readable storage medium according to claim 7, wherein the threshold of a period of time is obtained by an expression below:

$$(W\text{spin} - W1) \times Ts / (W1 - W2)$$

where Wspin is power consumption of the printing apparatus per unit time during start-up of the driving unit, W1 is power consumption of the printing method per unit time in the first operation state, W2 is power consumption of the printing method per unit time in the second operation state, and Ts is a period of time for starting up the driving unit.

* * * * *